Oct. 7, 1930.                F. RIES                 1,777,576
                         BUOYANT AIRPLANE
                         Filed Sept. 9, 1929
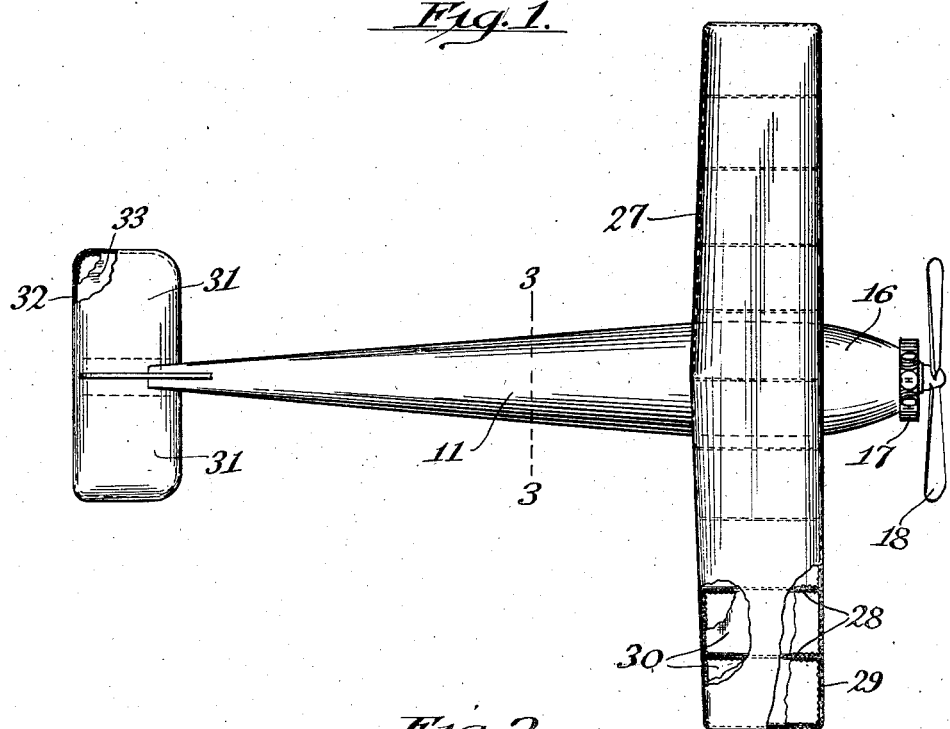
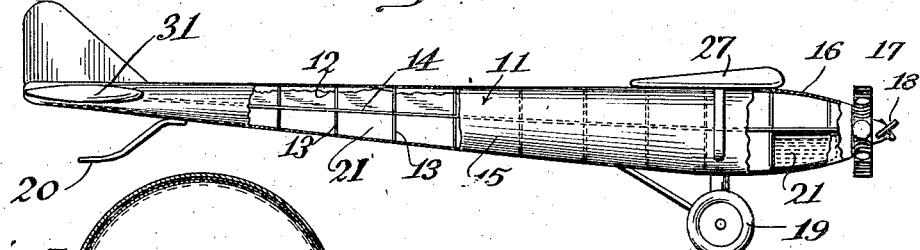
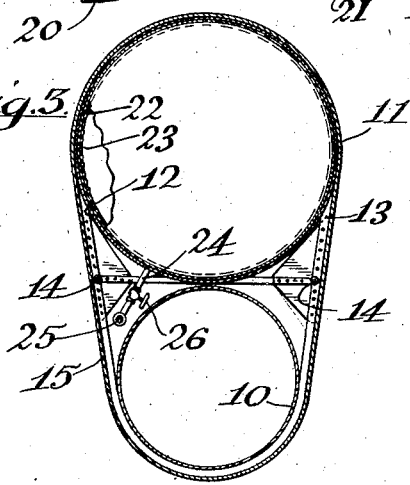
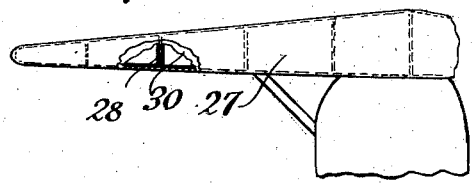
Inventor
FREDERICK RIES.
By Martin P. Smith
Attorney Patented Oct. 7, 1930

1,777,576

UNITED STATES PATENT OFFICE

FREDERICK RIES, OF COMPTON, CALIFORNIA

BUOYANT AIRPLANE

Application filed September 9, 1929. Serial No. 391,173.

My invention relates generally to aircraft and more particularly to a buoyant airplane, and the principal object of my invention is, to provide a power driven airplane with a plurality of separate compartments that are filled with buoyant gas and which latter exerts a lifting effect upon the airplane, consequently tending to render the same buoyant and self-sustaining in the air, with the result that the engine that is carried by the airplane may operate to greater advantage, inasmuch as the engine is required to develop only such degree of power as is necessary to propel the airplane forwardly and as the airplane is rendered self-sustaining by reason of the gas contained within the compartments, said airplane may be operated at much slower rates of speed than is required in heavier-than-air flying machines.

Further objects of my invention are, to construct an airplane wherein the main body or fuselage is constructed in two parts, the upper one of which comprises a series of gas containing chambers and the lower part containing chambers or compartments that are adapted to be occupied by fuel, necessary supplies, operating machinery and quarters for the crew and passengers; further, to provide an airplane having a wing or wings and elevators that are constructed substantially hollow and provided with separate chambers that are adapted to be filled with buoyant gas.

With the foregoing and other objects in view, my invention consists in certain novel features of construction and arrangement of parts that will hereinafter be more fully described and claimed and illustrated in the accompanying drawings, in which:

Fig. 1 is a top plane view of a buoyant airplane embodying the principles of my invention and which airplane is of the monoplane type.

Fig. 2 is a side elevational view of the buoyant airplane with parts thereof broken away and in section.

Fig. 3 is an enlarged cross section taken on the line 3—3 of Fig. 1.

Fig. 4 is a front elevational view of a portion of the airplane wing with parts broken away and in section.

Referring by numerals to the accompanying drawings which illustrate a practical embodiment of my invention, 10 designates the lower member of the airplane body which is in the form of an elongated hollow shell that tapers gradually toward its rear end and positioned directly above this lower member is the upper member 11 of the body which is in the form of an elongated hollow shell 12 that tapers gradually toward its rear end.

The walls of the upper and lower members 10 and 11 may be formed of any suitable light weight material, preferably sheet aluminum and said upper and lower bodies are connected at suitable distances apart throughout their lengths by encircling frames 13, preferably of metal and the sides of said frames are connected to each other by longitudinally disposed frame members 14, preferably metal tubes.

The hollow metal bodies 10 and 11 are covered by a sheathing 15, preferably thin metallic plates that are secured to the frame members 13 and 14.

The forward portions of the bodies 10 and 11 are tapered forwardly to form a nose portion 16 and at the forward end of this nose portion is arranged the engine 17 and associated in the usual manner with said engine is a propeller 18.

Arranged beneath the forward portion of the body is a pair of wheels 19 and arranged beneath the rear portion of the bodies is a landing skid 20.

The space within the lower body member 10 is divided into compartments 21 of suitable size and which compartments are adapted to contain fuel, supplies, freight and quarters for the crew and passengers.

The space within the upper member 11 of the airplane body is divided into a series of separate compartments and each compartment is lined with a layer 22 of asbestos or other heat resisting material and within each lined compartment is an envelop 23, preferably of silk or linen that is treated so as to render the same impervious to the passage of gas and each envelop is adapted to be inflated with buoyant gas, preferably helium.

Each envelop 23 is provided with a suitably located small filling tube 24 that is connected to a supply tube 25 which latter extends lengthwise of the body of the airplane and each filling tube is provided with a valve 26. When each envelop 23 is inflated with gas it rests directly against the lining 22 of asbestos or other heat insulating material.

Positioned on top of the forward portion of the upper body 11 is a transversely disposed hollow wing 27, the space within which is divided by partitions 28 into a series of separate chambers and each chamber is lined with thin sheets of asbestos 29 and arranged within each chamber is an inflatable fabric envelop 30 that is adapted to contain buoyant gas, preferably helium.

The underface of the wing 27 is preferably flat and the thickness of the wing structure gradually decreases from its center toward both ends, as illustrated in Fig. 4.

Projecting laterally from both sides of the rear end portion of the double body of the airplane are elevators 31 that are hollow and the chamber within each elevator is provided with a lining 32 of asbestos. Positioned within each hollow elevator is a fabric envelop 33 that is adapted to contain gas, preferably helium.

When all of the gas bags or envelops within body 10, wing 27 and elevators 31 are filled with gas, the airplane is rendered practically buoyant or self-sustaining in the air and as the engine is operated the airplane will be driven forwardly throughout a wide range of speeds.

Due to the fact that the body of the airplane is rendered buoyant by the gas contained in the envelopes within the body, wing and elevators, an engine having a comparatively small degree of power may be employed to operate the airplane for with the buoyant body the engine is not required to exert power to lift the body and to sustain the same during flight.

The asbestos linings within the compartments or chambers that contain the inflatable bags or envelopes provide comparatively soft walls against which the fabric envelopes engage while inflated and said asbestos linings tend to prevent undue expansion of the gases within the envelopes due to heat resulting from the sun's rays that strike against the outer shell 15 of the airplane body and the wall 12 of the upper body 11.

Thus it will be seen that I have provided a buoyant airplane that is relatively simple in construction, inexpensive of manufacture and which may be operated to much greater advantage than the ordinary types of heavier-than-air airplanes.

It will be understood that minor changes in the size, form and construction of the various parts of my improved buoyant airplane may be made and substituted for those herein shown and described without departing from the spirit of my invention, the scope of which is set forth in the appended claims.

I claim as my invention:

1. In an airplane, a lower elongated hollow body, an upper elongated hollow body, frames connecting the two bodies, partitions arranged within the upper body and dividing the space therein into a series of compartments, a lining of fire-proof heat insulating material within each compartment, a gas container within each compartment, a gas supply pipe arranged between and extending substantially parallel with said upper and lower bodies and branch pipes leading from said supply pipe to the gas containers within the compartments in the upper hollow body.

2. In an airplane, a pair of elongated hollow bodies, one arranged directly above the other, vertically disposed frames connecting the two bodies at spaced points throughout their length, longitudinally disposed members connecting the sides of said frames, a sheathing of thin metallic plates secured to the frames and longitudinal members and covering said tubular members so as to form a body that is substantially oval in cross section, the upper longitudinal member being divided into compartments, a lining of fire-proof heat resisting insulating material within each compartment and a gas container within each compartment.

3. In an airplane, a pair of elongated hollow bodies, one arranged directly above the other, vertically disposed frames connecting the two bodies at spaced points throughout their length, longitudinally disposed members connecting the sides of said frames, a sheathing of thin metallic plates secured to the frames and longitudinal members and covering said tubular members so as to form a body that is substantially oval in cross section, the upper longitudinal member being divided into compartments, a lining of fire-proof heat resisting insulating material within each compartment, a gas container within each compartment, a gas supply pipe extending longitudinally between said upper and lower hollow bodies and branch pipes leading from said gas supply pipe to the gas containers within the chambers of the upper longitudinal member.

In testimony whereof I affix my signature.

FREDERICK RIES.